(12) United States Patent
Fritz

(10) Patent No.: US 9,774,174 B1
(45) Date of Patent: Sep. 26, 2017

(54) DIELECTRIC HEAT TRANSFER WINDOWS, AND SYSTEMS AND METHODS USING THE SAME

(71) Applicant: EATON CORPORATION, Cleveland, OH (US)

(72) Inventor: Peter James Fritz, Williamston, MI (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 15/078,415

(22) Filed: Mar. 23, 2016

(51) Int. Cl.
| | |
|---|---|
| H02B 1/56 | (2006.01) |
| H02B 1/46 | (2006.01) |
| H01H 9/52 | (2006.01) |
| H01H 1/62 | (2006.01) |

(52) U.S. Cl.
CPC ............... *H02B 1/56* (2013.01); *H02B 1/46* (2013.01); *H01H 1/62* (2013.01); *H01H 9/52* (2013.01)

(58) Field of Classification Search
CPC . H02B 1/56; H02B 1/565; H01H 1/62; H01H 9/52
USPC .................................. 361/600–678; 200/289
See application file for complete search history.

(56) References Cited

U.S. PATENT DOCUMENTS

| | | | |
|---|---|---|---|
| 4,100,089 A | | 7/1978 | Cammack, II et al. |
| 4,733,329 A | | 3/1988 | Barner et al. |
| 5,196,815 A | * | 3/1993 | Chien ............... H01H 1/54 335/147 |
| 5,315,477 A | * | 5/1994 | Schumacher ...... H02B 1/56 200/289 |
| 5,315,830 A | | 5/1994 | Doke et al. |
| 8,270,167 B2 | | 9/2012 | Greenwood et al. |
| 8,373,195 B2 | | 2/2013 | Yen |
| 8,674,509 B2 | | 3/2014 | Carpenter et al. |
| 8,916,966 B2 | | 12/2014 | Mays |
| 9,214,405 B2 | | 12/2015 | Tsukamoto |
| 2001/0015509 A1 | | 8/2001 | Tiegs et al. |
| 2006/0072296 A1 | | 4/2006 | Mays |

(Continued)

FOREIGN PATENT DOCUMENTS

| | | |
|---|---|---|
| CN | 201879083 U | 6/2011 |
| JP | 05161511 A | 6/1993 |

OTHER PUBLICATIONS

USPTO, "Non-final Office Action" for corresponding U.S. Appl. No. 15/078,481, dated May 5, 2017, 13 pp.

*Primary Examiner* — Zachary M Pape
(74) *Attorney, Agent, or Firm* — Eckert Seamans; Ojeiku Aisiku; Grant Coffield

(57) ABSTRACT

Devices, systems, and methods for dissipating heat from electrical distribution assemblies and electrical switching devices are described herein. In one non-limiting embodiment, a dielectric material of relatively high thermal conductivity can be thermally coupled to electrical switching devices to act as a dielectric heat transfer window that dissipates heat. The dielectric heat transfer window includes at least a first portion thermally coupled to a heat generating component within an electrical switching device, and a second portion disposed external to the electrical distribution assembly or electrical switching device. Among other benefits, this allows heat generated within the electrical switching device to escape the interior of the electrical switching device to an environment external to the electrical switching device.

15 Claims, 4 Drawing Sheets

(56) References Cited

U.S. PATENT DOCUMENTS

| | | | |
|---|---|---|---|
| 2009/0068441 A1* | 3/2009 | Swaroop | C08K 3/0008 |
| | | | 428/329 |
| 2010/0304078 A1 | 12/2010 | Stol et al. | |
| 2012/0113569 A1 | 5/2012 | Peralta et al. | |
| 2012/0139075 A1 | 6/2012 | Shankar et al. | |
| 2012/0139076 A1 | 6/2012 | Shankar et al. | |
| 2012/0255719 A1* | 10/2012 | Hsueh | C04B 35/117 |
| | | | 165/185 |
| 2012/0281335 A1 | 11/2012 | Engel et al. | |
| 2014/0151687 A1 | 6/2014 | Yamazaki | |
| 2014/0166071 A1 | 6/2014 | Gaynes et al. | |
| 2014/0210072 A1 | 7/2014 | Tsukamoto | |
| 2015/0232732 A1 | 8/2015 | DiBattista et al. | |
| 2015/0349513 A1* | 12/2015 | Kim | H01H 1/62 |
| | | | 361/93.1 |

\* cited by examiner

DIELECTRIC HEAT TRANSFER WINDOWS, AND SYSTEMS AND METHODS USING THE SAME

BACKGROUND

Field

The disclosed concept relates generally to electrical power systems and, more particularly, to electrical distribution assemblies. The disclosed concept relates to dielectric materials of high thermal conductivity that can be molded or assembled into electrical distribution assemblies to act as heat transfer windows that dissipate heat generated in and/or around electrical distribution assemblies. The disclosed concept further relates to methods for removing heat from an electrical switching device.

Background Information

Electrical distribution assemblies generally include electrical switching devices. When current runs through an electrical switching device, heat is generated by components of the electrical switching device. As a result of this heat, the temperature within and around the electrical switching device, and more generally the electrical distribution assembly, tends to increase. This heat, if it becomes excessive, can cause various events to occur, including but not limited to damage to components, other devices, premature activation of trip mechanisms, and other malfunctions. In addition, electrical distribution assemblies and electrical switching components therein may include other circuitry, such as control circuitry, which further generate heat within and around electrical distribution assemblies. Likewise, as electrical distribution assemblies and electrical switching devices therein are developed with greater complexity, the heat generated throughout the electrical distribution assembly and electrical components may increase. As a result of this potential increase in heat, it may become somewhat difficult for the electrical distribution assemblies and electrical switching devices to operate within the given temperature ranges established by various safety organizations as an industry standard. These codes include, but are not limited to, the UL-67 safety codes, which include requirements that temperatures within electrical distribution assemblies not exceed 50 degrees centigrade over ambient.

Accordingly, it is desirable to couple thermally conductive materials to various components of electrical distribution assemblies and the electrical switching devices therein to transfer heat away from those components. As such, electrical distribution assemblies and electrical switching devices generally include at least some thermally conductive materials coupled to various heat generating components. However, due to cost constraints, potential structural weakness, and various other inefficiencies related to these thermally conductive materials, a better thermally conductive material for performing the vital task of heat transfer is needed. For example, thermal interface materials ("TIM"), poly-phenylene oxide ("PPO"), and epoxy resin assemblies are known to be thermally conductive and electrically insulating, and thus are used to transfer heat from vulnerable components in an electrical distribution assembly. However, PPO and epoxy resin insulation products often lack the desirable strength to maintain structural integrity under extreme conditions for desirable periods of time, and as such have a tendency to break apart. Additionally, in some instances relating to electrical distribution assemblies involving electrical conductors, TIMs may provide insufficient thermal conductivity unless they are of a sufficiently thermally conductive variety that tends to be prohibitively expensive. For example, a thermal coupling of certain TIMs to various materials generally found within an electrical switching device may result in what is called an "air gap," whereby a small space is present at the point of coupling between the TIM and the material. This results in a reduction of the thermal conductivity of the TIM, and thus reduces the amount of heat that may be transferred away from the vulnerable components. Additionally, TIMs generally are limited to a thermal conductivity of roughly 1 W/(m·K) before becoming prohibitively expensive.

There is thus room for improvement in electrical power systems, and in electrical distribution assemblies and the components therein.

SUMMARY

These needs and others are met by aspects of the disclosed concept, which are directed to dielectric heat transfer windows and associated methods for reducing temperatures within and around electrical distribution assemblies and electrical switching devices therein.

In one aspect of the disclosed concept, a system for removing heat from an electrical distribution assembly is provided. The system includes an electrical distribution assembly, an electrical switching device comprising a heat generating component, and a thermally conductive ceramic element comprising a dielectric material and at least a first portion and a second portion, said first portion being thermally coupled to the heat generating component, said second portion being external to the electrical switching device, wherein the electrical distribution assembly is electrically coupled to the electrical switching device, and wherein the thermally conductive ceramic element is thermally coupled to the electrical switching device.

In another aspect of the disclosed concept, an electrical switching device is provided. The electrical switching device comprises a heat generating component and a thermally conductive ceramic element, comprising a dielectric material and at least a first portion and a second portion, said first portion being thermally coupled to the heat generating component, said second portion being external to the electrical distribution assembly, wherein the thermally conductive ceramic element is thermally coupled to the electrical switching device.

In another aspect of the disclosed concept, a method of removing heat from an electrical switching device is provided. The method comprises providing a source of electrically generated heat within an electrical switching device, thermally coupling the source of heat to a ceramic element, and aligning at least a portion of the ceramic element with an exterior surface of the electrical switching device such that the portion forms part of the exterior of the electrical switching device.

BRIEF DESCRIPTION OF DRAWINGS

A full understanding of the disclosed concept can be gained from the following description of the preferred embodiments when read in conjunction with the accompanying drawings.

DESCRIPTION OF THE PREFERRED EMBODIMENTS

Figure 1A:
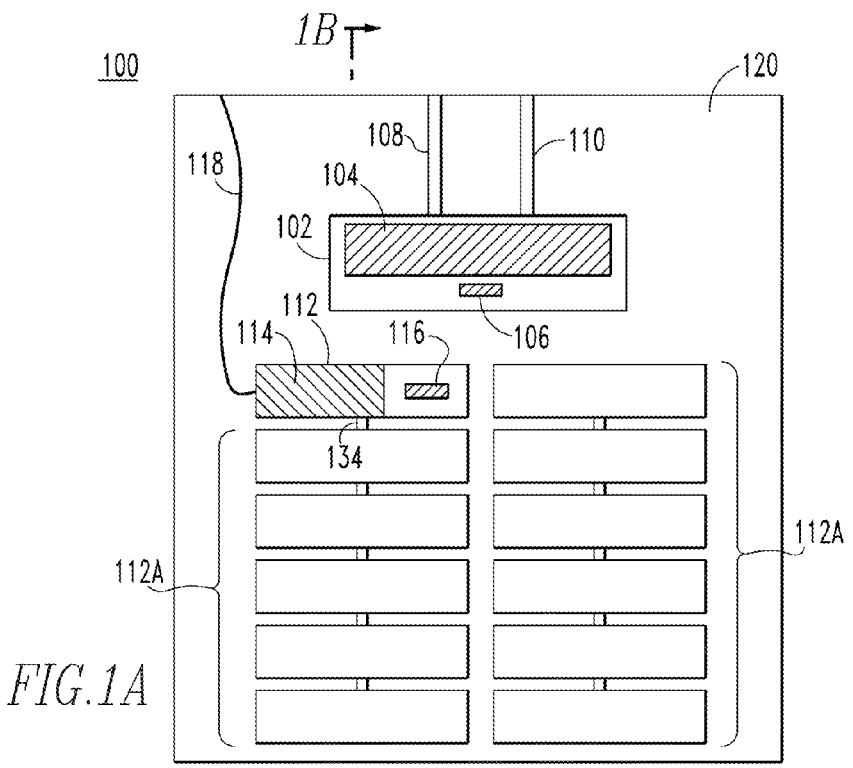
FIG. 1A is an illustrative schematic diagram presenting a frontal view of an electrical distribution assembly in accordance with an embodiment of the disclosed concept.

The disclosed concept may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features.

Directional phrases used herein, such as, for example, left, right, front, back, top, bottom, and derivatives thereof, relate to the orientation of the elements shown in the drawings and are not limiting upon the claims unless expressly recited therein.

As employed herein, the singular form of "a", "an", and "the" include plural references unless the context clearly dictates otherwise. Still further, as used herein, the term "number" shall mean one or an integer greater than one (e.g., a plurality).

As employed herein, the terms "connected" or "coupled" shall mean that two or more parts are joined together directly or joined through one or more intermediate parts. Furthermore, the term "attach" or "attached", as employed herein, shall mean that two or more parts are joined together directly or through one or more intermediate parts.

Further still, as employed herein, the terms "thermally coupled" or "thermally connected" or "thermally attached" shall mean that two or more parts are joined together directly or through one or more intermediate parts such that heat may flow between the two or more parts.

As employed herein, the terms "electrically coupled" or "electrical communication" shall mean that two or more the parts or components are joined together either directly or joined through one or more intermediate parts such that electricity, current, voltage, and/or energy is operable to flow from one part or component to the other part or component, and vice versa.

FIG. 1A is an illustrative schematic diagram presenting a frontal view of an electrical distribution assembly 100 in accordance with an embodiment of the disclosed concept. In one non-limiting embodiment, electrical distribution assembly 100 includes: a main circuit breaker 102 including a ceramic element 104, a switch 106, a hot wire 108, and a neutral ground 110 connected to main circuit breaker 102. Electrical distribution assembly 100, in the illustrative embodiment, further includes a branch circuit breaker 112 having a ceramic element 114, a switch 116, and a wire 118, which is connected to branch circuit breaker 112. Further still, electrical distribution assembly 100 includes a cavity 120 located within electrical distribution assembly 100, and bus bars 134 connected to branch circuit breaker 112.

In an illustrative embodiment, one or more of branch circuit breakers 112A (12 branch circuit breakers 112A are shown in the example of FIG. 1A) are included within electrical distribution assembly 100, where each branch circuit breaker 112A is substantially similar to branch circuit breaker 112, whereby each branch circuit breaker 112A includes ceramic element 114 and switch 116, while also being connected to wires similar to 118 and to bus bar 134. For ease of illustration and economy of disclosure, branch circuit breakers 112A of FIG. 1A are drawn in a simplified form.

In an embodiment of the disclosed concept, main circuit breaker 102 includes at least one ceramic element 104 thermally coupled to main circuit breaker 102. An electrical circuit is generally formed by electrical current running from an external power source into main circuit breaker 102 via hot wire 108, through at least one electrical current carrying component, and out of main circuit breaker 102 through bus bar 134. It will be appreciated that when a current is running through an electrical current carrying component, the temperature of the electrical current carrying component increases. Accordingly, heat is generated by the electrical current carrying component within main circuit breaker 102. Upon the occurrence of an overload condition, including but not limited to the event that the temperature of the electrical current carrying component reaches a certain predetermined level, a trip mechanism is activated, causing an electrical current carrying component to mechanically break the circuit and stop the current from running through main circuit breaker 102, as signified when the switch 106 located on the exterior of main circuit breaker 102 is in an "off" position. To reduce the temperature in and around main circuit breaker 102, ceramic element 104 is coupled to a heat generating component and is structured to transfer heat away from a heat generating component toward the surface of main circuit breaker 102, and dissipate the heat into cavity 120 of electrical distribution assembly 100.

As mentioned above, branch circuit breakers 112A are, in one embodiment, substantially similar to branch circuit breaker 112, and therefore include the components (e.g., ceramic element 114, switch 116, wire 118, and bus bar 134). Similar to main breaker 102, an electrical circuit is generally formed in branch circuit breaker 112 by electrical current running from bus bar 134, through at least one electrical current carrying component housed within branch circuit breaker 112, and out of the branch circuit breaker via wire 118. When current is running through an electrical current carrying component, the heat generated by various components that the branch circuit breaker is comprised of increases, thereby generating heat in and around branch circuit breaker 112. Upon the occurrence of an overload condition, including but not limited to the event that the temperature of the electrical current carrying component reaches a certain predetermined level, a trip mechanism is activated, causing an electrical current carrying component to mechanically break the circuit and stop the current from running through branch circuit breaker 112, as signified when switch 116 located on the exterior of branch circuit breaker 112 is in an "off" position. To reduce the heat generated by various components of branch circuit breaker 112, thereby preventing several malfunctions to these components, ceramic element 114 is thermally coupled to a heat generating component and is structured to transfer heat away from an electrical current carrying component toward the surface of branch circuit breaker 112, and to dissipate said heat into cavity 120 of electrical distribution assembly 100.

Figure 1B:
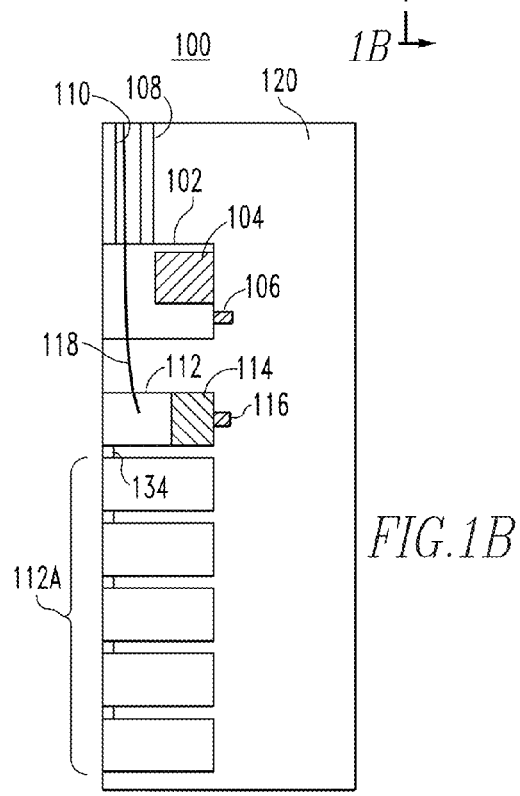
FIG. 1B is an illustrative schematic diagram presenting a side cross sectional view of the electrical distribution assembly as depicted in FIG. 1A.

FIG. 1B is an illustrative schematic diagram presenting a cross sectional side view of electrical distribution assembly 100 as depicted in FIG. 1A. In one non-limiting embodiment of the disclosed concept, electrical distribution assembly 100 is substantially rectangular and may be any size capable of housing at least one electrical switching device. Electrical distribution assembly 100 may be capable of housing any number of electrical switching devices and can be structured to provide an electrical current to a device, building, or any other electrical system requiring electricity (e.g., currents of less than 100 amperes, 125 amperes, 150 amperes, 200 amperes, or any current necessary to power an electrical system). Although electrical distribution assembly 100 is shown including both main circuit breaker 102 and branch circuit breaker 112 persons of ordinary skill in the art will recognize that electrical distribution assembly 100 may alternatively include a single electrical switching device or multiple electrical switching devices.

Main circuit breaker 102 in one non-limiting embodiment is substantially rectangular and corresponds to any circuit breaker suitable for acting as a disconnecting means to the entire power load of the electrical distribution assembly. Main circuit breaker 102 may be suitable to connect to a single hot wire, two hot wires, three hot wires, or any number of hot wires necessary to provide desirable amount of electricity (e.g., a one-pole breaker, a two-pole breaker, a three-pole breaker, etc.). Main breaker 102, for example, may be a molded case circuit breaker, a miniature circuit breaker, a fuse, or any type of switchgear or other electrical switching device.

Main circuit breaker 102, in one embodiment, is thermally coupled to ceramic element 104 in any suitable manner to facilitate the dissipation of heat from within main circuit breaker 102 to an environment external to main circuit breaker 102 via ceramic element 104. For example, main circuit breaker 102 may be thermally coupled to ceramic element 104 via molding, adhesion, latching, a clinch joint, or any other suitable method known in the art for thermal coupling.

Ceramic element 104, in one non-limiting embodiment, includes a first portion and a second portion. The first portion of ceramic element 104 is coupled to a heat generating component and the second portion of ceramic element 104 is located in an environment external to main circuit breaker 102. Ceramic element 104 is structured to act as a dielectric heat transfer window in which heat generated by main circuit breaker 102 is dissipated into an environment external to main circuit breaker 102. Ceramic element 104, in one embodiment, is formed of a thermally conductive dielectric material. Various types of thermally conductive dielectric materials include, but are not limited to, boron nitride, aluminum nitride, aluminum oxide, and/or poly-phenylene oxide.

In one embodiment, electrical distribution assembly 100 includes branch circuit breaker 112 including ceramic element 114 for a dielectric heat transfer window and switch 116 for turning the circuit within branch circuit breaker 112 on or off. Branch circuit breaker 112 in one non-limiting embodiment is substantially rectangular and includes any circuit breaker suitable for acting as a disconnecting means to a circuit. Branch circuit breaker 112 is structured to connect to a single hot wire, two hot wires, three hot wires, or any number of hot wires necessary to provide a desirable amount of electricity (e.g., a one-pole breaker, a two-pole breaker, a three-pole breaker, etc.). In one embodiment, branch circuit breaker 112 is a molded case circuit breaker, a miniature circuit breaker, or a fuse, however persons of ordinary skill in the art will recognize that any type of switchgear or other electrical switching device may be used.

In one embodiment, the environment external to the electrical switching device includes a cavity 120 located within electrical distribution assembly 100. The cavity may be any length, width, or depth suitable for heat to be transferred into. Furthermore, the cavity may be closed, open, include vents, or be otherwise structured to facilitate the dissipation of heat from the electrical switching device.

Branch circuit breaker 112 is structured to be thermally coupled to ceramic element 114 in any suitable manner to facilitate the dissipation of heat from electrical switching device 112 to cavity 120 via ceramic element 114. For example, the branch circuit breaker may be structured to thermally couple to a ceramic element via molding, adhesion, latching, a clinch joint, or any other suitable method known in the art.

Ceramic element 114, in one non-limiting embodiment, includes a first portion and a second portion. The first portion is thermally coupled to a heat-generating component and the second portion forms at least one surface of main breaker 112. Ceramic element 114 is structured to act as a dielectric heat transfer window in which heat is generated by branch circuit breaker 112 and dissipated into cavity 120. Ceramic element 114 may include a thermally conductive dielectric material. Various types of thermally conductive dielectric materials include, but are not limited to, boron nitride, aluminum nitride, aluminum oxide, and/or poly-phenylene oxide.

Figure 2:
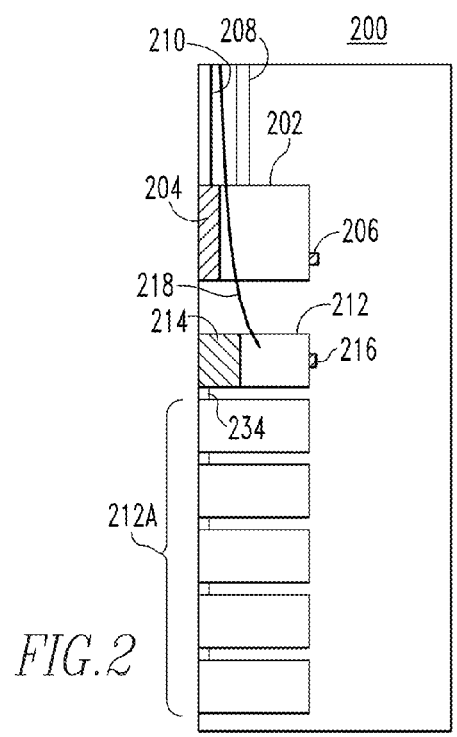
FIG. 2 is an illustrative schematic diagram presenting a side cross sectional view of an electrical distribution assembly equipped with electrical switching devices in accordance with an embodiment of the disclosed concept.

FIG. 2 is an illustrative diagram presenting a side view of an electrical distribution assembly 200 equipped with electrical switching devices in accordance with an embodiment of the disclosed concept. The electrical distribution assembly 200 includes a main circuit breaker 202, a ceramic element 204, a switch 206, a hot wire 208 and a neutral ground 210. Electrical distribution assembly 200 also includes one or more of branch circuit breakers 212 and 212A, each of which include a ceramic element 214 and a switch 216, and are connected to a wire 218 and a bus bar 234. Although electrical distribution assembly 200 includes both main breaker 202 and branch circuit breaker 212 in tandem persons of ordinary skill in the art will recognize that this is merely a non-limiting embodiment. In one embodiment, branch circuit breakers 212A are substantially similar to branch circuit breaker 212, whereby each branch circuit breaker 212A includes a ceramic element 214 and switch 216, while being connected to wire 218 and bus bar 234.

In an embodiment of the disclosed concept, the main circuit breaker 202 includes one or more of ceramic element 204 thermally coupled to main circuit breaker 202. To prevent excessively high temperatures and a resulting premature breaking of the current as signified by the switch 206 being in an "off" position, ceramic element 204 is thermally coupled to a heat generating component of main circuit breaker 202, which, in one embodiment, is structured to transfer heat away from main circuit breaker 202, through a surface of electrical distribution assembly 200, and into an environment external to electrical distribution assembly 200.

In one embodiment, ceramic element 204 includes at least a first portion and a second portion. The first portion is coupled to a heat-generating component located within main circuit breaker 202. The second portion is located external to main circuit breaker 202 and is structured to act as a dielectric heat transfer window through which heat is transferred from within main circuit breaker 202 outward to an environment external to main circuit breaker 202. In the illustrative embodiment, ceramic element 204 forms a surface of electrical distribution assembly 200, thus preventing excessive heat from being generated within electrical distribution assembly 200. In one non-limiting embodiment, ceramic element 204 is structured to transfer heat from within main circuit breaker 202 through a rear or side opening in electrical distribution assembly 200. In an embodiment, ceramic element 204 extends along a length of electrical circuit switching assembly 202 such that it is structured to provide a maximum surface area to facilitate heat transfer from within the electrical switching device to the environment external to electrical distribution assembly 200.

Similarly, within electrical distribution assembly 200 is branch circuit breaker 212 that includes ceramic element 214. Branch circuit breaker 212 includes at least one heat-generating component, however for simplicity, the at least one heat-generating component is not shown. To prevent excessively high temperatures and a resulting premature breaking of the current as signified by switch 216 being in an "off" position, ceramic element 214 is coupled to branch circuit breaker 212 so that it is structured to transfer heat away from branch circuit breaker 212, through the surface of electrical distribution assembly 200, and into an environment external to electrical distribution assembly 200.

Figure 3:
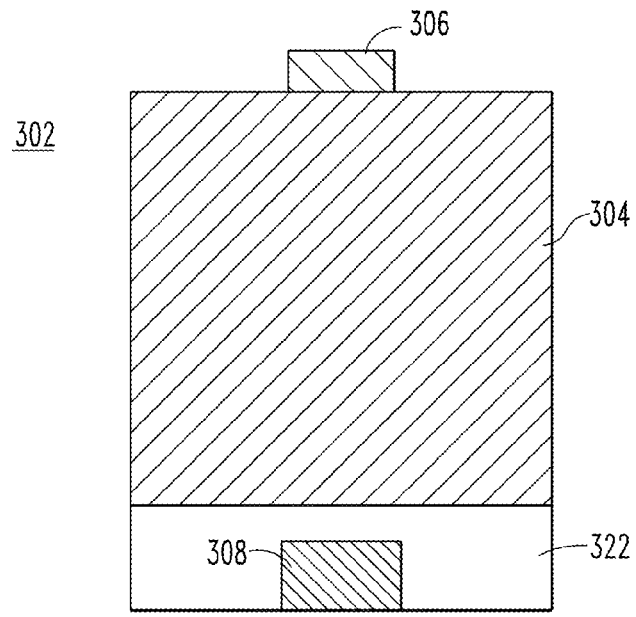
FIG. 3 is an illustrative schematic diagram presenting a top view of an electrical switching device in accordance with an embodiment of the disclosed concept.

FIG. 3 is an illustrative schematic diagram presenting a top view of an electrical switching device 302. Electrical switching device 302 includes a ceramic element 304, a switch 306, a heat generating component 308, and a case 322.

Ceramic element 304 is structured to have sufficient thickness to maintain the structural integrity of electrical switching device 302 and to protect electrical switching device 302 in the event of an explosion, overheating, malfunctions to other components, or other undesirable conditions caused by excessive heat. Further, to prevent a premature activation of a trip mechanism as described above and signified by switch 306 being in an "off" position, ceramic element 304, having a high thermal conductivity, is thermally coupled to heat generating component 308 and as such is structured to transfer heat away from heat generating component 308 and into an environment external to electrical switching device 302. Although there are various other components generally included in electrical switching device 302 and not shown in FIG. 3, it is understood that ceramic element 304 may be thermally coupled to any component capable of transferring heat inside or outside of electrical switching device 302, including but not limited to conductors, heat plates, inserts, fins, metal blocks, and heat pipes.

In one embodiment, ceramic element 304 is molded into case 322 of electrical switching device 302. When electrical switching device 302 is in operation, heat is generated by heat generating component 308, and the heat is transferred to case 322. Heat is then transferred to ceramic element 304, which acts as a heat transfer window to dissipate heat outward from within electrical switching device 302 to an environment external to electrical switching device 302. Ceramic element 304 may include a thermally conductive dielectric material. Various types of thermally conductive dielectric materials include, but are not limited to, boron nitride, aluminum nitride, aluminum oxide, and/or polyphenylene oxide.

In an embodiment of the disclosed concept, case 322 may be formed from any suitable material to house electrical current carrying component 308 and any other components of electrical switching device 302. Various types of components include but are not limited to, breaker contacts, trip actuators, electromagnetic bars, wires, conductors, heat plates, inserts, fins, metal blocks, and heat pipes. In one embodiment, case 322 is formed of any suitable material including, but not limited to, metals, plastics, poly-phenylene oxide, and/or a thermal interface material. In one embodiment, ceramic element 304 is coupled to heat generating component 308 via case 322. For example, case 322 may include a thermally conductive material structured to transfer heat away from heat generating component 308 and/or provide structural support to electrical switching device 302.

Figure 4:
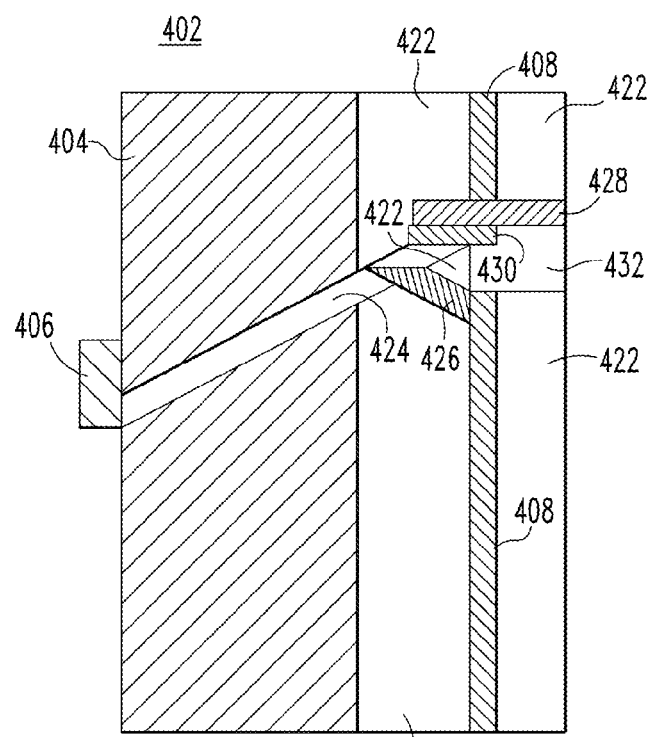
FIG. 4 is an illustrative schematic diagram presenting a side cross-sectional view of an electrical switching device in accordance with an embodiment of the disclosed concept.

FIG. 4 is an illustrative schematic diagram presenting a side cross-sectional view of an electrical switching device 402 in accordance with an embodiment of the disclosed concept. Electrical switching device 402, in the embodiment, includes a ceramic element 404, a switch 406, an electrical current carrying component 408, a case 422, a lever 424, a trip mechanism 426, a stationary contact 428, a movable contact 430, and an arc extinguisher 432. As current carrying component 408 within the electrical distribution assembly is in operation, a current runs through electrical current carrying component 408, which generates heat. In the event of an overload condition or short circuit, the trip bar activates, causing the movable contact to separate from the stationary contact, thereby breaking the circuit. For example, a broken circuit may be represented by switch 406 being in an "off" position. Ceramic element 404 is structured such that the heat travels from electrical circuit carrying component 408, into molded case 422, through ceramic element 404, and into an environment external to electrical switching device 402.

In one embodiment, ceramic element 404 is a substantially rectangular block that includes at least a first portion and a second portion. The first portion is coupled to electrical current carrying component 408. The second portion forms at least part of the surface of electrical switching device 402 and is structured to transfer heat from electrical switching device 402 to an environment external to electrical switching device 402. The distance between the first portion and second portion of ceramic element 404 may be any distance suitable for heat transfer from within electrical switching device 402 to an environment external to electrical switching device 402. Ceramic element 402 may be cubic, spherical, semispherical, pyramidal, or any shape or combination thereof suitable for providing a maximum surface area of thermal coupling to electrical switching device 402. Ceramic element 402 may be made of any grade of boron nitride, aluminum nitride, aluminum oxide, or any other compound structured to have sufficient strength provide structural support to electrical switching device 402 and transfer heat from within electrical switching device 402 to an environment external to electrical switching device 402. For example, ceramic element 402 may be made of the many grades of boron nitride that are commercially available. In the illustrative embodiment, a first side of ceramic element 404 is coupled to electrical circuit carrying component 408 via case 422. Ceramic element 404 is structured so as to not interfere with the functioning of the other components of electrical switching device 402. For example, when an overload or short circuit occurs, trip mechanism 426 is activated, which causes pull lever 424 to be pulled downward, thereby separating movable contact 430 from stationary contact 428. Although there are various other components generally included in electrical switching device 402, persons of ordinary skill in the art will recognize that ceramic element 404 may be thermally coupled to any component capable of generating heat inside or outside of an electrical switching device, including but not limited to conductors, heat plates, inserts, fins, metal blocks, and heat pipes.

In one embodiment, stationary contact 428 is electrically coupled to movable contact 430. When contacts 428 and 430 are separated while an electrical current is running between them, a high power discharge of electricity may occur, forming an electric arc between the now separated contacts. Electrical switching device 402, therefore, includes arc extinguisher 432 to contain and extinguish the arc. Nevertheless, the arc generates a substantial amount of heat and increases the risks of explosion, melting, fires, malfunctions to other components, and other events. Accordingly, ceramic elements 404 help to reduce the heat within electrical switching device 402 by absorbing the heat from the arc and dissipating the heat into an environment external to electrical switching device 402.

Figure 5:
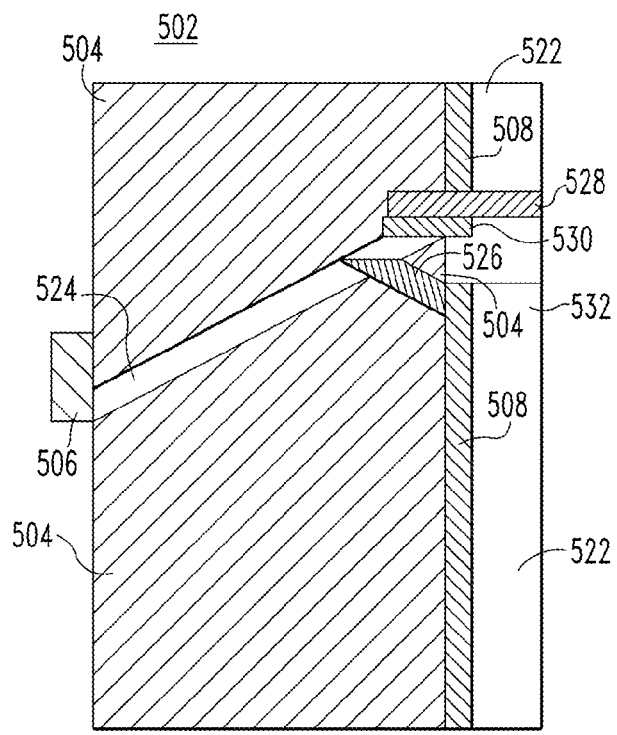
FIG. 5 is an illustrative schematic diagram presenting another side cross-sectional view of an electrical switching device in accordance with an embodiment of the disclosed concept.

FIG. 5 is an illustrative diagram presenting another side cross sectional view of an electrical switching device 502 in accordance with an embodiment of the disclosed concept. Electrical switching device 502 includes a ceramic elements 504, a switch 506, an electrical current carrying component 508, a lever 524, a trip bar 526, a stationary contact 528, a movable contact 530, and an arc extinguisher 532.

In one embodiment, one or more of ceramic element 504 may be included in electrical switching device 502 as needed such that ceramic elements 504 fit around the various internal components in electrical switching device 502. As a current runs through electrical current carrying component 508, electrical current carrying component 508 generates heat. Ceramic elements 504 are structured such that current carrying components 508, and any additional components generating heat within electrical switching device 502 are exposed to a maximum surface area of ceramic elements 504 as possible without ceramic elements 504 interfering with the functions of the components of electrical switching device 502. Ceramic elements 504 are structured such that the heat generated by electrical circuit carrying components 508 and other internal components within electrical switching device 502 is transferred to ceramic elements 504, whereby the heat is dissipated into an environment external to electrical switching device 502. Persons of ordinary skill in the art will recognize that ceramic element 504 may be thermally coupled to any component capable of generating heat inside or outside of electrical switching device 502, including but not limited to conductors, heat plates, inserts, fins, metal blocks, and heat pipes.

Figure 6:
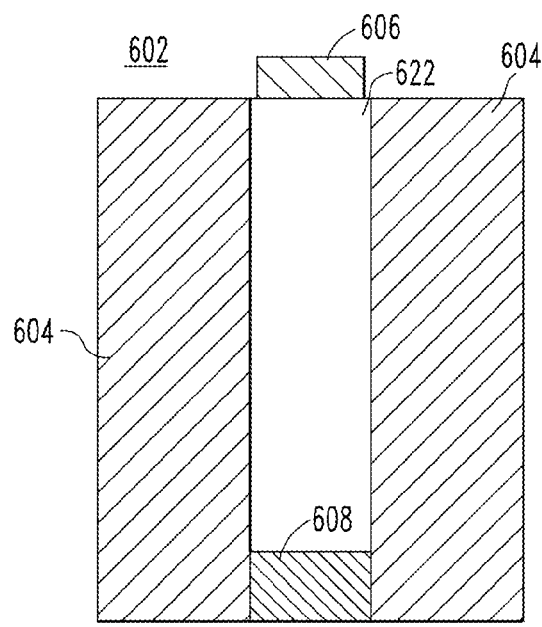
FIG. 6 is another illustrative schematic diagram presenting a top view of an electrical switching device in accordance with an embodiment of the disclosed concept.

FIG. 6 is an illustrative schematic diagram of an electrical switching device 602 in accordance with an embodiment of the disclosed concept. The electrical switching device 602 includes ceramic elements 604, a switch 606, an electrical current carrying component 608, and a case 622. Ceramic elements 604 each have a first portion and a second portion. The first portions of ceramic elements 604 are coupled to electrical current carrying component 608, and the second portions of ceramic elements 604 form a surface of electrical switching device 602 such that ceramic elements 604 are structured to transfer heat from various components of electrical switching device 602 to an environment external to electrical switching device 602.

In one embodiment, ceramic elements 604 are directly coupled to electrical current carrying component 608. However, ceramic elements 604 may be coupled to electrical current carrying component via case 622, a thermal interface material, or any thermally conductive material. In a non-limiting embodiment, electrical switching device 602 is substantially rectangular, and ceramic elements 604 are also substantially rectangular and are molded into case 622 such that ceramic elements 604 conform to the shape of electrical switching device 602.

Electrical switching device 602 includes any device structured to connect and disconnect an electrical current in a distribution assembly. For example, the electrical switching device 602 may be switchgear, such as a main circuit breaker, a branch circuit breaker, or a fuse. Electrical switching device 602 may comprise any material known in the art, including poly-phenylene oxide, a thermal interface material, or fiberglass.

In an embodiment of the disclosed concept, electrical switching device may include a heat generating component. In an embodiment of the disclosed concept, a heat generating component may be a component that generates heat in and/or around electrical switching device 602. In an embodiment of the disclosed concept, a heat-generating component may be an electrical current carrying component and comprise any material known in the art, including silver tungsten, silver tungsten carbide, copper tungsten, silver graphite, silver tungsten carbide graphite, or any other material capable of carrying an electrical current. Furthermore, in an embodiment of the disclosed concept, a heat generating component may be any component capable of generating heat inside or outside of electrical switching device 602, including but not limited to conductors, heat plates, inserts, fins, metal blocks, and heat pipes.

Ceramic elements 604, in a non-limiting embodiment, are molded into electrical switching device 602 and as such can be any shape suitable for optimal thermal coupling to electrical current carrying component 608. In a non-limiting embodiment, ceramic elements 604 comprise a thermally conductive material, dielectric material. Ceramic element 604 may be made of any grade of boron nitride, aluminum nitride, aluminum oxide, or any other thermally conductive compound structured to have sufficient strength provide structural support to electrical switching device 602 and transfer heat from within electrical switching device 602 to an environment external to electrical switching device 602. Ceramic elements 604 include a first portion and a second portion. The first portions are thermally coupled to an electrical current carrying component 608 and structured to transfer heat away from the electrical current carrying component 608 to an environment external to electrical switching device 602. In an embodiment of the disclosed concept, the first portion of the ceramic element 604 is structured to maximize the surface area of the coupling between ceramic element 604 and electrical current component 608. The dimensions of ceramic elements 604 are structured such that the tensile strength of ceramic elements 604 are capable of maintaining the structural integrity of electrical switching device 602 in the event of fires, explosions, or other undesirable events caused by excessive heat. For example, ceramic element 604 is molded to conform to the shape and structure of electrical switching device 602 and the surface areas of ceramic elements 604 are such that it allows the first portions of ceramic elements 604 to couple to heat generating components and encapsulates at least a portion of a heat generating component. The distance between the first portion and second portion of ceramic element 604 may be any distance suitable for heat transfer from electrical switching device 602 to an environment external to electrical switching device 602. Ceramic elements 604 may be cubic, spherical, semispherical, pyramidal, or any shape or combination thereof suitable for providing a maximum surface area of thermal coupling to electrical switching device 602. Although there are various other components generally included in electrical switching device 602 and not shown in FIG. 6, it is understood that ceramic element 604 may be thermally coupled to any component capable of generating heat inside or outside of electrical switching device 602, including but not limited to conductors, heat plates, inserts, fins, metal blocks, heat pipes, arc extinguishers and control circuitry.

The environment external to electrical switching device 602 may correspond to any suitable environment, such as, for example, a cavity within an electrical distribution assembly. As another example, the environment may be a vent built into an distribution assembly for the ventilation of heat. As still another example, the environment is external to an electrical distribution assembly, or the environment may be open space.

Figure 7:
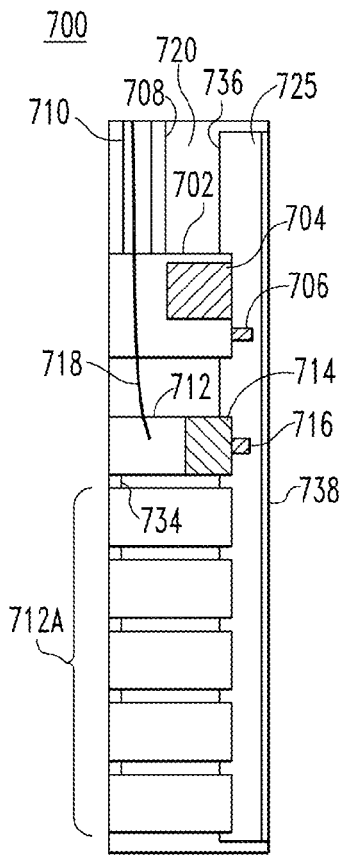
FIG. 7 is another illustrative schematic diagram presenting a cross sectional side view of an electrical distribution assembly in accordance with an embodiment of the disclosed concept.

FIG. 7 is an illustrative schematic diagram presenting a cross sectional side view of an electrical distribution assembly 700 in accordance with an embodiment of the disclosed concept. FIG. 7 is substantially identical to FIG. 1B, such that for each element in 1B labeled 1XX, the similar element in FIG. 7 is labeled 7XX. For example, main circuit breaker 102 in FIG. 1B is labeled as main circuit breaker 702 in FIG. 7. Electrical distribution assembly 700 includes: a main circuit breaker 702 including a ceramic element 704, a switch 706, a hot wire 708 and a neutral ground 710 connected to main circuit breaker 702, a branch circuit breaker 712 having a ceramic element 714, a switch 716, and a wire 718 connected to branch circuit breaker 712, and bus bars 734 connected to branch circuit breaker 712. In addition, FIG. 7 also shows cavity 725, a trim assembly 736 and a door 738.

In a non-limiting embodiment, cavity 725 exists between trim assembly 736 and door 738. Trim assembly 736 is mechanically coupled to the walls of electrical distribution assembly such that it encloses wires, circuit breakers, bus bars, and other internal components of electrical distribution assembly 700 and acts as a barrier between these internal components and the environment external to electrical distribution assembly 700. Trim assembly 736 includes several openings. Main circuit breaker 702 and branch circuit breakers 712 each extend from a wall of electrical distribution assembly 700 through the openings in trim assembly 736. The openings in trim assembly 736 act to hold circuit breakers 702 and 712 in place, particularly when a user is moving switches 706 and 716 into the "on" or "off" positions. Accordingly, switches 706 and 716, as well as ceramic elements 704 and 714 are located at least in part within cavity 725. As such, heat is able to dissipate from circuit breakers 702 and 712 into cavity 725 via ceramic elements 704 and 714.

Door 738 functions to open and close so as to allow access to circuit breakers 702 and 712. Further, when heat dissipates into cavity 725, cavity 725 increases in heat. As such, door 738 opens so that heat further dissipates into the outside environment external to electrical distribution assembly 700 in order to more efficiently remove heat from electrical distribution assembly 700.

Figure 8:
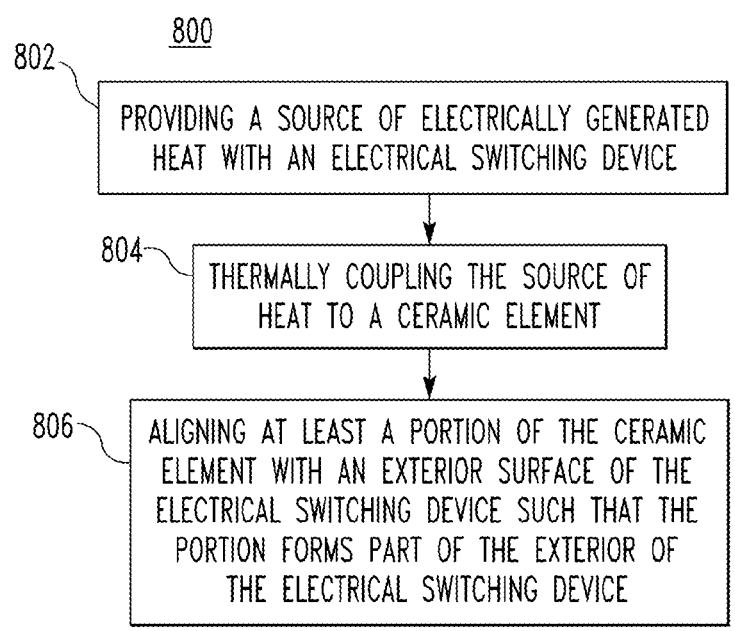
FIG. 8 is an illustrative flowchart of a method for removing heat from an electrical switching device in accordance with an embodiment of the disclosed concept.

FIG. 8 is an illustrative flowchart of a process for removing heat from an electrical switching device in accordance with an embodiment of the disclosed concept. Process 800 begins, in one embodiment, at step 802. At step 802, a source of electrically generated heat within an electrical switching device is provided. For example, the source of heat may be any component or device associated with the electrical switching device.

At step 804, the source of heat is thermally coupled to a ceramic element. The thermal coupling made be performed via a procedure or many procedures, including, but not limited to, molding, adhesion, latching, a clinch joint, a thermal interface material such as a thermal adhesive, or any other suitable method known in the art for thermal coupling.

At step 806, at least a portion of the ceramic element is aligned with an exterior surface of the electrical switching device such that the portion forms part of the exterior of the electrical switching device. In one embodiment, the electrical switching device is electrically coupled to the electrical distribution assembly. Additionally, a portion of the ceramic element is aligned with an exterior surface of the electrical distribution assembly such that the portion forms part of the exterior of the electrical distribution assembly.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the disclosed concept has been described in detail for the purpose of illustration based on what is currently considered to be the most practical and preferred embodiments, it is to be understood that such detail is solely for that purpose and that the disclosed concept is not limited to the disclosed embodiments, but, on the contrary, is intended to cover modifications and equivalent arrangements that are within the spirit and scope of the appended claims. For example, it is to be understood that the disclosed concept contemplates that, to the extent possible, one or more features of any embodiment can be combined with one or more features of any other embodiment.

What is claimed is:

1. A method of removing heat from an electrical switching device, comprising:

providing a source of electrically generated heat within an electrical switching device;

thermally coupling the source of heat to a ceramic element;

aligning at least a portion of the ceramic element with an exterior surface of the electrical switching device such that the portion forms part of the exterior of the electrical switching device;

electrically coupling the electrical switching device to an electrical distribution assembly; and aligning at least a portion of the ceramic element with an exterior portion of the electrical distribution assembly such that a portion forms part of the exterior of the electrical distribution assembly.

2. The method of claim 1, wherein the source of heat is thermally coupled to the ceramic element via a thermally conductive and electrically insulating material.

3. The method of claim 2, wherein the thermally conductive and electrically insulating material comprises a thermal interface material.

4. The method of claim 2, wherein the thermally conductive and electrically insulating material comprises polyphenylene oxide or an epoxy resin.

5. The method of claim 1, wherein the ceramic material comprises boron nitride.

6. The method of claim 1, wherein the ceramic material comprises aluminum nitride.

7. The method of claim 1, wherein the ceramic material comprises aluminum oxide.

8. The method of claim 1, wherein the ceramic material comprises a metallic compound.

9. A system for removing heat from an electrical distribution assembly, comprising:
   an electrical distribution assembly comprising a source of electrically generated heat;
   an electrical switching device comprising a heat generating component, wherein the electrical switching device is electrically coupled to the electrical distribution assembly; and
   a thermally conductive ceramic element coupled to the source of electrically generated heat, the ceramic element comprising:
     a dielectric material; and
     at least a first portion and a second portion, said first portion being thermally coupled to the heat generating component, said second portion being aligned with an exterior portion of the electrical distribution assembly such that said second portion forms part of the exterior of the electrical distribution assembly.

10. The system of claim 9, wherein the ceramic element comprises aluminum nitride.

11. The system of claim 9, wherein the ceramic element comprises aluminum oxide.

12. The system of claim 9, wherein the ceramic element comprises a metallic compound.

13. The system of claim 9, wherein the thermally conductive ceramic element is coupled to the source of electrically generated heat via a thermally conductive and electrically insulating material.

14. The system of claim 13, wherein the thermally conductive and electrically insulating material comprises a thermal interface material.

15. The system of claim 13, wherein the thermally conductive and electrically insulating material comprises polyphenylene oxide or an epoxy resin.

* * * * *